(12) United States Patent
Solihin (10) Patent No.: US 8,615,633 B2
(45) Date of Patent: Dec. 24, 2013

(54) MULTI-CORE PROCESSOR CACHE COHERENCE FOR REDUCED OFF-CHIP TRAFFIC

(75) Inventor: Yan Solihin, Apex, NC (US)

(73) Assignee: Empire Technology Development LLC, Wilmington, DE (US)

( * ) Notice: Subject to any disclaimer, the term of this patent is extended or adjusted under 35 U.S.C. 154(b) by 842 days.

(21) Appl. No.: 12/428,563

(22) Filed: Apr. 23, 2009

(65) Prior Publication Data

US 2010/0274971 A1    Oct. 28, 2010

(51) Int. Cl.
    *G06F 13/00*    (2006.01)
(52) U.S. Cl.
    USPC ........... 711/122; 711/135; 711/141; 711/146; 711/E12.001; 711/E12.022; 711/E12.026; 711/E12.033
(58) Field of Classification Search
    USPC .................. 711/122, 135, 146, 141, E12.001, 711/E12.022, E12.026, E12.033
    See application file for complete search history.

(56) References Cited

U.S. PATENT DOCUMENTS

| | | | |
|---|---|---|---|
| RE32,900 E | 4/1989 | Orsic | |
| 6,959,374 B2 | 10/2005 | Schulz | |
| 7,225,300 B1 | 5/2007 | Choquette et al. | |
| 7,552,241 B2* | 6/2009 | Ramey | 710/1 |
| 7,626,588 B1 | 12/2009 | Molnar et al. | |
| 7,640,399 B1* | 12/2009 | Lepak et al. | 711/136 |
| 7,853,755 B1* | 12/2010 | Agarwal et al. | 711/141 |
| 7,921,266 B2 | 4/2011 | Rangarajan et al. | |
| 7,975,109 B2 | 7/2011 | McWilliams et al. | |
| 7,987,321 B1* | 7/2011 | Agarwal et al. | 711/141 |
| 2003/0140200 A1 | 7/2003 | Jamil et al. | |
| 2005/0044340 A1 | 2/2005 | Sheets et al. | |
| 2005/0076181 A1 | 4/2005 | Hsu | |
| 2006/0143384 A1 | 6/2006 | Hughes et al. | |
| 2006/0265552 A1 | 11/2006 | David et al. | |
| 2007/0226425 A1 | 9/2007 | Caprioli et al. | |
| 2009/0031085 A1 | 1/2009 | Carpenter et al. | |
| 2009/0031086 A1 | 1/2009 | Carpenter et al. | |
| 2009/0274413 A1 | 11/2009 | Beausoleil et al. | |
| 2010/0241811 A1* | 9/2010 | Solihin | 711/137 |
| 2010/0274971 A1 | 10/2010 | Solihin | |

FOREIGN PATENT DOCUMENTS

EP    1376368 A2    1/2004

OTHER PUBLICATIONS

U.S. Official Action dated Aug. 18, 2011 in U.S. Appl. No. 12/408,075.
U.S. Notice of Allowance dated Dec. 19, 2011 in U.S. Appl. No. 12/408,075.

(Continued)

Primary Examiner — Pho M Luu
(74) Attorney, Agent, or Firm — Hope Baldauff, LLC (57) ABSTRACT

Technologies are generally for maintaining cache coherency within a multi-core processor. A first cache entry to be evicted from a first cache may be identified. The first cache entry may include a block of data and a first tag indicating an owned state. An owner eviction message for the first cache entry may be broadcasted from the first cache. A second cache entry in a second cache may be identified. The second cache entry may include the block of data and a second tag indicating a shared state. The broadcasted owner eviction message may be detected with the second cache. An ownership acceptance message for the second cache entry may be broadcasted from the second cache. The broadcasted ownership acceptance message may be detected with the first cache. The second tag in the second cache entry may be transformed from the shared state to the owned state.

32 Claims, 7 Drawing Sheets

(56) References Cited

OTHER PUBLICATIONS

Chang et al., "Cooperative Cache Partitioning for Chip Multiprocessors," 2007, Proc. of 21st annual Intl. Conf. on Supercomputing, pp. 242-252, Jun. 2007.

Guo et al., "A Framework for Providing Quality of Service in Chip Multi-Processors," Dec. 2007, Proc. of the 40th Annual IEEE/ACM Symposium on Microarchitecture, pp. 343-355.

Hsu et al., "Communist, Utilitarian, and Capitalist Cache Policies on CMPs: Caches as a Shared Resource," 2006, Proc. of the 15th Intl. Conf. on Parallel Architectures and Compilation Techniques, pp. 13-22, Sep. 2006.

Iyer et al., "QoS Policy and Architecture for Cache/Memory in CMP Platforms," Jun. 2007, Proc. of the ACM SIGMETRICS Conference on Measurement and Modeling of Computer Systems, pp. 25-36.

Nesbit et al. "Virtual Private Caches," 2007, Proc.of the 34th Intl. Symp. on Computer Architecture, pp. 57-68, Jun. 2007.

Qureshi et al., "Utility-Based Cache Partitioning: A Low-Overhead, High-Performance, Runtime Mechanism to Partition Shared Caches," 2006, Proc. of the 39th IEEE/ACM Intl. Symp. on Microarchitecture, pp. 423-432, Sep. 2006.

Kim, S. et al. "Fair Cache Sharing and Partitioning on a Chip Multiprocessor Architecture" InProc.of the Intl. Conf. on Parallel Architectures and Compilation Techniques, pp. 111-122, 2004, Oct. 2004.

Suh et al., "Analytical Cache Models with Applications to Cache Partitioning," 2001, In Proc. of the 15th Intl. Conf. on Supercomputing, pp. 1-12, Feb. 2001.

Lin Chao, "Meet the Intel® Core TM Duo Processor," Intel Technology Journal, vol. 10, Issue 2, May 15, 2006.

AMD, "AMD64 Architecture Programmer's Manual vol. 2: System Programming", Publication #24593, Rev. 3.14, Dec. 2005.

Chaudhuri, M. and Heinrich, M., "The Impact of Negative Acknowledgments in Shared Memory Scientific Applications," IEEE Transactions on Parallel and Distributed Systems, vol. 15, Issue 2, Feb. 2004.

European Office action mailed on Sep. 12, 2011 for European Patent Application No. 10154699.2.

Michael Zhang et al., "Victim Replication: Maximizing Capacity while Hiding Wire Delay in Tiled Chip Multiprocessors," (2005), IEEE, May 2005.

Michael R. Marty et al., "Virtual Hierarchies to Support Server Consolidation," (2007), University of Wisconsin-Madison, Jun. 2007.

Prasenjit Sarkar et al., "Efficient Cooperative Caching using Hints," (1996), University of Arizona, Oct. 1996.

Chang et al., "Cooperative Caching for Chip Multiprocessors," ISCA '06 Proceedings of the 33rd annual international symposium on Computer Architecture, IEEE Computer Society Washington, DC, USA 2006, Jul. 2006.

International Search Report for International Application No. PCT/US2010/050144 mailed on Aug. 28, 2011.

Notice of Allowance & Fees Due mailed on Nov. 21, 2011 for U.S. Appl. No. 12/649,659, Yan Solihin, filed Dec. 30, 2009.

\* cited by examiner

MULTI-CORE PROCESSOR CACHE COHERENCE FOR REDUCED OFF-CHIP TRAFFIC

BACKGROUND

Multi-core processor systems integrate increasing numbers of processor cores onto a single die. Generally, off-chip bandwidth may not increase as quickly as the number of processor cores on the die. Off-chip bandwidth may often be limited by the number of pins interfacing between a chip and its socket or printed circuit board. The limited off-chip bandwidth may be shared among increasingly numerous processor cores.

A multi-core processor system may involve multiple distributed caches. For example, each processor may have a local cache. In an example, two caches may contain local copies of the same memory location in the main system memory. If data stored in one of the caches is modified, the data stored in the other cache and in the main system memory may become stale. As a result, the other cache may be invalidated or modified in the same way. Eventually, these modifications may be reflected in the main system memory. Maintaining integrity and consistency between the local caches and the main system memory may be a significant consumer of off-chip bandwidth. Naive approaches to frequently synchronize all instances of a cache entry and the associated main system memory may involve non-optimal use of limited off-chip bandwidth resources.

SUMMARY

Technologies are described herein for cache coherence supporting reduced off-chip memory traffic in multi-core processors. An ownership transfer upon eviction of a cache block by an owner cache can avoid a write back to main memory of the cache block. A cache entry can be identified in an owned state to be evicted from a first cache. An owner eviction message can be advertised from the first cache. A second cache can be identified as holding the cache entry in a shared state. Ownership of the cache entry may be transferred from the first cache to the second cache.

Also, ownership of a cache block can be dynamically assigned to a cache that has most recently accessed the block. This may support reduced write backs of dirty-shared cache blocks because the most recently accessed cache block is less likely to be evicted in the near future. A cache eviction may cause a write back to main memory. A cache miss may be incurred at a first cache when an attempt is made to read a cache entry. A read request message may be advertised from the first cache. An owner cache of the cache entry may be identified as a second cache. Ownership of the cache entry may be transferred from the second cache to the first cache.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The following detailed description is generally related to technologies for a cache coherence protocol that may reduce off-chip memory traffic in multi-core processors. As used herein, cache coherence refers to maintaining integrity and consistency of between data stored in local caches (e.g., an on-chip cache or an off-chip cache) and data stored in off-chip memory (e.g., main system memory). Ownership transfer upon eviction of a cache block by an owner cache can avoid a write back to main memory of a dirty block. When one or more other caches have a copy of the block being evicted by the owner, one of these other caches can become the new owner instead of transferring the block to off-chip memory. Also, dynamically assigning ownership of a cache block to the cache that has most recently accessed the block may reduce the frequency of write backs of dirty-shared blocks. Transferring ownership of a shared, but dirty, cache block from its current owner to a reader cache may improve the probability that the cache block stays in cache memory for the longest possible time period. As such, the writing of blocks to off-chip memory may be reduced. The disclosed cache techniques may support improved off-chip bandwidth efficiency in multi-core processor cache systems using broadcast and snoop coherence protocols. The disclosed cache techniques may also support improved off-chip bandwidth efficiency in multi-core processor cache systems using directory based coherence protocols.

Although not so limited, some embodiments may refer to an on-chip cache, which is a cache coupled to a processor on the same chip. It should be appreciated that these embodiments may be similarly implemented for an off-chip cache, which includes external caches not on the same chip as the processor.

Figure 1:
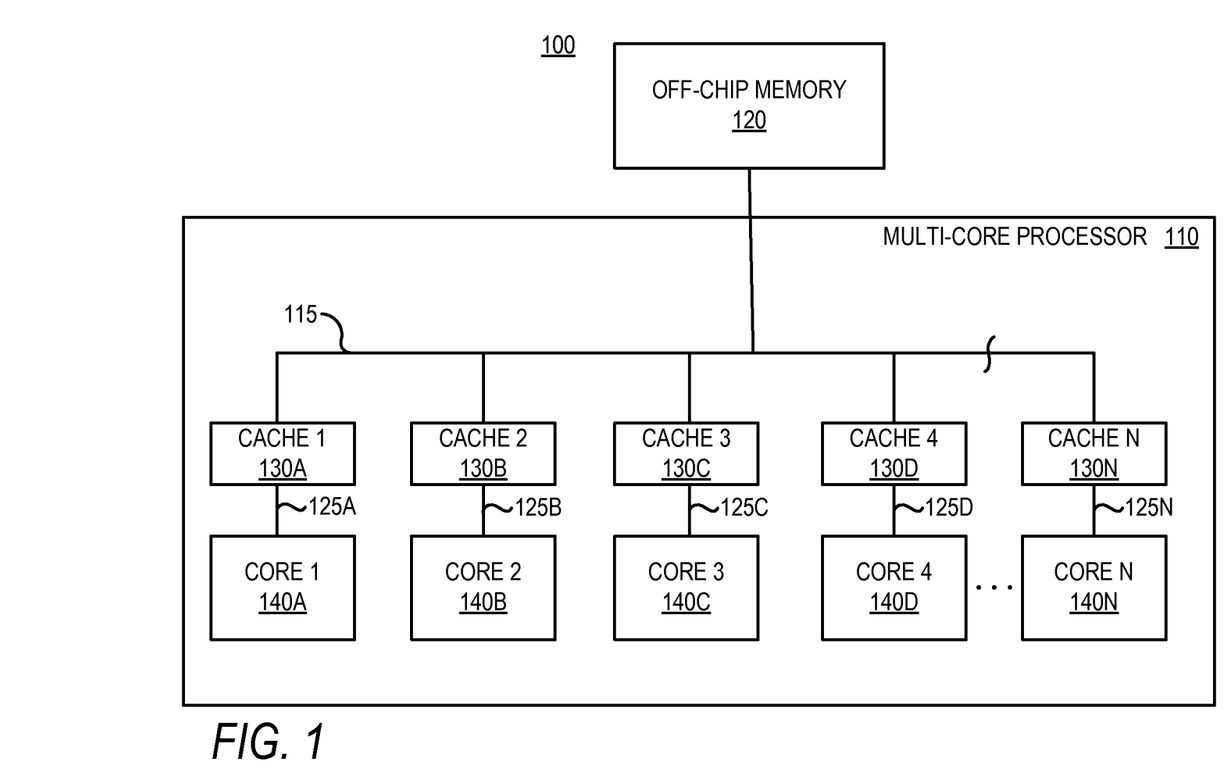
FIG. 1 is a block diagram illustrating a multi-core processor coupled to an off-chip memory.

FIG. 1 is a block diagram 100 illustrating a multi-core processor coupled to an off-chip memory, arranged in accordance with the present disclosure. Functional block diagram 100 illustrates a multi-core processor 110 coupled to an off-chip memory 120 according to an embodiment presented herein. The multi-core processor 110 may have multiple processor cores, such as core 1 through core N 140A-140N. These may be referred to collectively, or generally, as processor cores 140. The multiple processor cores 140 can generally support parallel processing, parallel tasks, parallel threads, separate sequential processes, or any combination thereof.

The off-chip memory 120 may be accessed by the multi-core processor 110. The off-chip memory 120 may be referred to as the main-memory in an example computing system. The multi-core processor 110 may read from and write to the off-chip memory 120. Such reads and writes may relate to both instructions and data associated with operations of the multiple processor cores 140 of the multi-core processor 110. Generally, each of the processor cores 140 within the multi-core processor 110 may individually access the off-chip memory 120. The off-chip memory 120 may be random access memory (RAM), static RAM (SRAM), dynamic RAM (DRAM), synchronous DRAM (SDRAM), or any type of volatile or non-volatile memory. It should be appreciated that the off-chip memory 120 may also be an off-chip cache.

Each of the multiple processor cores 140 may be associated with a cache, such as cache 1 through cache N, 130A-130N. These may be referred to collectively, or generally, as caches 130. The caches 130 can comprise small and fast memory. The caches 130 can store frequently used, recently used, or soon to be used blocks of memory for rapid access by one or more of the processor cores 140. The caches 130 may mitigate some of the latency associated with accessing off-chip memory 120. While the caches 130 may be assigned on a one-to-one basis to the processor cores 140, the caches 130 may also be shared between two or more processor cores 140. It should be appreciated that the caches 130 may be part of, or a layer within, a multilevel caching system.

A cache coherence protocol can define coherence states of cache entries. A cache coherence protocol can also provide rules for transitioning between these states. Cache entry states and transition rules may be implemented as a finite state machine (FSM). A cache coherence protocol coding for modified, owned, exclusive, shared, and invalid (MOESI) states may be referred to as a MOESI cache coherence protocol. Other cache coherence protocols may involve various subsets of these states and can include, for example, MSI (modified, shared, invalid), MESI (modified, exclusive, shared, invalid), or MOSI (modified, owned, shared, invalid) cache coherence protocols.

A cache entry in a "modified" state can store the most recent version of the cache entry while the version in the off-chip memory 120 may not be the most recent or updated version (sometimes referred to as a "stale entry"). Generally, when a cache entry is in the modified state, no other caches may have a copy of the most recent version of the cache entry. A cache entry in a "shared" state may be the most recent version of the cache entry. A cache entry in the "owned" state may be the most recent version of the cache entry while other caches in the caches 130 may also have copies of the most recent version in the shared state. When there is a cache in the owned state, the copy of the entry in the off-chip memory 120 may be stale, but when there is no owner, the off-chip memory 120 may have the latest version of the cache entry. A cache entry in the "exclusive" state may be the most recent version of the cache entry, while the copy of the cache entry in the off-chip memory 120 may also be correct and no other caches may have the most recent version of the cache entry. A cache entry in an "invalid" state may not have the most recent version of the cache entry, while other caches may have the most recent version.

An interconnect bus 115 may interconnect the processor cores 140 to the off-chip memory 120 through the caches 130. Although only a single interconnect bus 115 is illustrated in FIG. 1, it should be appreciated that two or more interconnect busses may interconnect the processor cores 140 to the off-chip memory 120 through the caches 130. Additional interconnect busses 125A-125N may interconnect the processor cores 140 to the corresponding caches 130. In some examples, the specific cache (e.g., 130A) and a specific processor core (e.g., 140A) may be integrated together, while in other examples they may be separate from one another. The interconnect bus 115 can be a parallel bus, a serial bus, a packet bus, a master/slave bus, a grant/request bus, a clocked bus, or any other type of bus for interconnecting processor cores 140 with memory such as the off-chip memory 120. The interconnect bus 115 may support any type of interconnect topology including a traditional bus, a ring, a tree, a mesh, a torus, any other interconnecting network or topology, or any combination thereof. The interconnect bus 115 can support read and write operations from the processor cores 140 to the off-chip memory 120. These reads and writes may be executed by the processor cores 140 or by cache controllers (not shown in FIG. 1) associated with the caches 130 on behalf of the processor cores 140. The signals for communicating between the caches 130 may be part of the interconnect bus 115 as illustrated, or separate signal lines (not illustrated) may be provided for interconnecting the caches 130. Communication between the caches 130 can include posting cache coherency messages that are part of the cache coherency protocol. The posting of messages may also be referred to as advertising massages to the interconnect bus 115. Communication between the caches 130 can also include replicating or updating cache entries between caches 130 to maintain cache coherency.

A cache coherence protocol, such as the MOESI protocol, may use broadcast and snoop techniques. In a broadcast and snoop system, each of the caches 130 can snoop the interconnect bus 115 to detect broadcasts, or other activities, made by other caches in the caches 130. The other caches may broadcast events or make other actions that alter the state of the cache entries in the snooping caches. For example, when one of the caches 130 writes to a block, a broadcast from that cache can inform other cache controllers of the write. The other caches 130 may snoop the broadcast and transition their corresponding cache entry states to the invalid state.

In multi-core processor 110 implementations supporting broadcast and snoop cache coherence protocols, a significant consumption of bandwidth to off-chip memory 120 may be due to cache misses and write-backs. A multi-core processor 110 using a MOESI cache coherence protocol may support dirty-sharing. In a dirty-sharing system, a cache entry that has not been written back to the off-chip memory 120 may be shared from one of the caches 130 in an owned state to another one of the caches 130 in a shared state on the multi-core processor 110. Such dirty-sharing can avoid writes of the cache entry to the off-chip memory 120 in order to use the cache entry at another one of the processor cores 140. These avoided off-chip writes can support reduced off-chip bandwidth consumption.

A multi-core processor 110 using a MESI protocol may instead support clean-sharing, where a clean-shared cache entry may have the same data as the version of the corresponding off-chip memory 120. In clean-sharing, a cache entry transitioning from the exclusive state to being shared by multiple caches 130 may also be written back to the off-chip memory 120. This write-back may be performed even though the cache entry may not be removed from the caches 130. Such a write-back may unnecessarily increase off-chip traffic thereby consuming available off-chip bandwidth.

Reduction of off-chip traffic (or on-chip traffic depending on the specific implementation of the processor cores, caches and system memory) may be supported by transferring ownership upon eviction of a cache entry in an owned state. When one of the caches 130 may be participating in dirty-sharing as an owner evicts an owned cache entry, the cache entry may be written out to off-chip memory 120 (i.e., the system memory). This off-chip write can increase bus traffic even when there may be other caches 130 retaining a copy of the cache entry. A traffic-conserving protocol may be arranged to avoid sending the cache entry out to off-chip memory 120 when at least one other cache in the caches 130 has a copy of the cache entry. This may be done by transferring the ownership to the cache with the copy of the cache entry.

Reduction of off-chip traffic may also be supported by an owner assignment policy that can reduce premature write back to off-chip memory 120. In some caching scenarios, the cache 130 holding a cache entry in the owned state may be considered as the latest cache to have a written cache entry. Recently-written cache entries may be less likely to be evicted in the near future. However, rarely-written cache entries may stay in a cache for a short period before a cache eviction triggers a write back to off-chip memory 120. The presently described traffic-conserving protocol may be arranged to select one of the caches 130 to hold the cache entry in the owned state by identifying one of the caches 130 with the highest probability of maintaining the cache entry in the caches 130 for the longest time. The described techniques may also continuously, or periodically, identify other caches in the caches 130 that may improve the time for keeping the cache entry on chip. These techniques may reduce transfers from the caches 130 to the off-chip memory 120. Such protocols for reducing transfers from the caches 130 to the off-chip memory 120 may be implemented in the caches 130 of the multi-core processor 110. Reducing off-chip traffic by transferring ownership to the most recent reader and reducing off-chip traffic by transferring ownership in response to a cache block eviction may be performed separately or together within a caching system.

Figure 2:
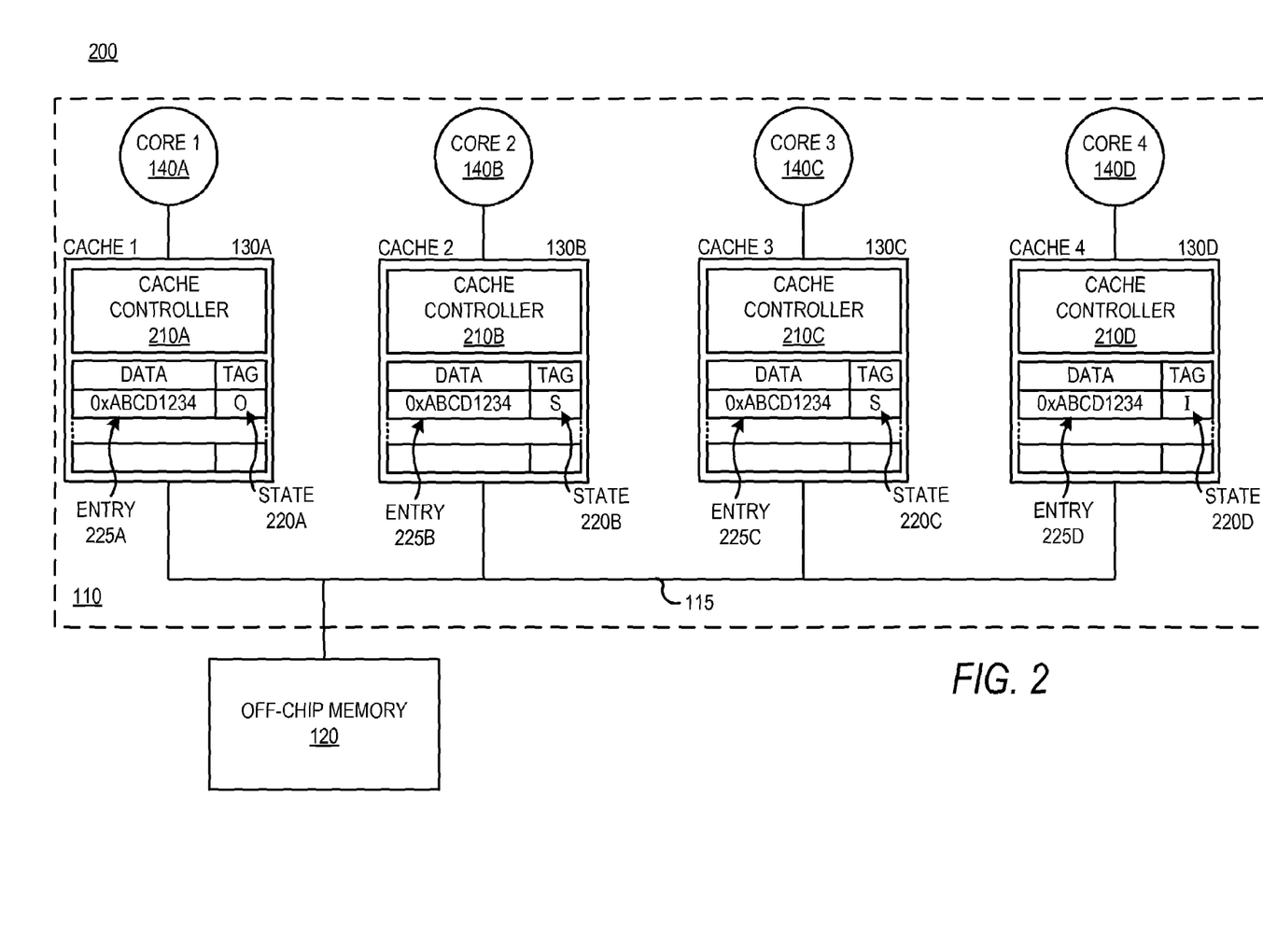
FIG. 2 is a block diagram illustrating four processor cores and their respective caches within a multi-core processor.

FIG. 2 is a block diagram 200 illustrating four processor cores 140 and their respective caches 130 within a multi-core processor 110, arranged in accordance with the present disclosure. The multi-core processor 110 may have multiple processor cores 140. While four processor cores 140 are illustrated, a multi-core processor 110 may have any number of processor cores 140. Each of the processor cores 140 may be associated with one or more caches, such as caches 130A-130D as discussed with respect to FIG. 1. An off-chip memory 120 may be accessed by the multi-core processor 110. An interconnect bus 115 may interconnect the processor cores 140 and the off-chip memory 120, through the caches 130.

Each individual cache from the caches 130 may include a corresponding cache controller, such as the cache controllers 210A-210D. The cache controllers 210A-210D may be referred to collectively, or in general, as cache controllers 210. Each of the cache controllers 210 may support the caching of memory reads and writes by the corresponding one of the processor cores 140. The cache controllers 210 may also support cache evictions, prefetches, and various other operations of the caches 130. The cache controllers 210 may also implement the cache coherency protocols and the cache coherency off-chip traffic reduction techniques discussed herein.

Caches 130 may each store several cache entries 225A-225D (collectively or generically referred to as cache entries 225). Each of the cache entries 225 may include a block of data and a tag. The data may include, for example, a copy of data from an area of off-chip memory 120 that is cached at the multi-core processor 110 for rapid access by the associated processor core 140. The data may also include, for example, data recently written by the associated processor core 140 and held in the caches 130 before eventually being written out to off-chip memory 120. A tag can include information about where the cached data block corresponds to physical memory in the off-chip memory 120. The tag may also include flags for specifying if the entry is dirty or clean. Generally, a dirty entry can be out of sync with the corresponding off-chip memory 120 and eventually may be written back to update the off-chip memory 120. The tag may also include cache coherency state indicators, such as state indicators 220A-220D. These state indicators 220A-220D may be referred to collectively, or in general, as state indicators 220. According to some embodiments, various other flags, indicators, addressing information, coherency information, and metadata may be stored within the tag as well.

The state indicators 220 can indicate any of the states such as modified, owned, exclusive, shared, invalid, and so on. For example, state indicator 220A shows that the illustrated cache entry 225A in cache 1 (130A) is in the owned state (as indicated by an "O" symbol), whereas state indicator 220B shows that the illustrated cache entry 225B in cache 2 (130B) is in the shared state (as indicated by an "S" symbol).

When one of the caches 130 that is participating in dirty-sharing as an owner evicts the owned cache entry, the cache entry may be written out to off-chip memory 120. This off-chip write may result in an increase in off-chip traffic even when there may be other caches 130 retaining a copy of the cache entry. The described traffic-conserving protocol may be arranged to avoid sending the cache entry out to off-chip memory 120 when at least one other cache in the caches 130 has a copy of the cache entry. This may be done by transferring the ownership to one of the other caches 130.

In the illustrated scenario, the cache entry 225A in cache 1 (130A) is in the owned state given by the "O" in the state indicator 220A, the cache entry 225B in cache 2 (130B) is in the shared state given by the "S" in the state indicator 220B, and the cache entry 225C in cache 3 (130C) is in the shared state given by the "S" in the state indicator 220C. The caches 130 having an "O" in the state indicator 220 may be referred to as the owner caches. The owner cache, i.e. cache 1 (130A) in FIG. 2, may indicate a pending eviction of the cache entry by posting an "ownership eviction" message on the interconnect bus 115. Other caches in the caches 130 can snoop the message off of the interconnect bus 115. Other caches in the caches 130 that currently have the same cache entry in the shared state, such as cache 2 (130B) and cache 3 (130C), may respond by posting an "ownership acceptance" message on the interconnect bus 115.

The current owner cache, cache 1 (130A), can identify the cache in the caches 130 associated with the earliest received "ownership acceptance" message. Ownership of the cache entry can then be transferred to this identified cache. The original owner can then evict the cache entry without having to write it back to off-chip memory 120. The identified first responder can transition its state indicator 220 from "S" for shared to "O" for owned. Any other responding caches 130 were not transferred ownership because their "ownership acceptance" message may not have been the earliest received. These other caches 130 can maintain the cache entry in the shared state with "S" as the state indicator 220.

Reduction of off-chip traffic may also be supported by an owner assignment policy that can reduce premature write back to off-chip memory 120. In some caching scenarios, the cache 130 holding a cache entry in the owned state may be considered as the latest cache to have a written cache entry. Recently-written cache entries may be less likely to be evicted in the near future. However, rarely-written cache entries may stay in the caches 130 for a short period before a cache eviction triggers a write back to the off-chip memory 120. The presently described traffic-conserving protocol may be arranged to select a cache (e.g., 130A) to hold a cache entry in the owned state (e.g., state indicator 220A) by identifying one of the caches 130 with the highest probability of maintaining the cache entry in a cache for the longest time. The described techniques may also be arranged to continuously, or periodically, identify other caches in the caches 130 that improve the length of time for keeping the cache entry. A reduced number of transfers from the caches 130 to the off-chip memory 120 may be realized with the presently described traffic-conserving protocol.

When one of the processor cores 140 attempts a read of data that is not currently available within an associated one of the caches 130, an associated one of the cache controllers 210 may evoke a cache miss. The specific cache may become a reader cache and read the requested data into the cache to mitigate the missed read. The reader cache may post a "read request" message to the interconnect bus 115.

In the illustrated scenario, the cache entry 225A in cache 1 (130A) is in the owned state given by the "O" in the state indicator 220A, and the cache entry 225D in cache 4 (130D) is in the invalid state given by the "I" in the state indicator 220D. With cache 4 (130D) holding the cache entry 225D in an invalid state, a read to the cache entry 225D may evoke a cache miss at cache 4 (130D). Thus, the cache controller 210D at cache 4 (130D) may become a reader cache and post a "read request" message to the interconnect bus 115. Other caches 130 may snoop the message off of the interconnect bus 115. The current owner cache, cache 1 (130A) in the illustrated example, may respond to the "read request" message by providing the data for the cache entry to the reader cache associated with processor core 4 (140D).

In other caching scenarios, providing a copy from an owner cache to another one of the caches 130 does not change the owner cache, but instead puts the new reader cache into the shared state with respect to the cache entry in question. However, temporal locality dictates that the cache most recently accessing the cache entry, in this case the new reader cache associated with processor core 4 (140D), may tend to keep the cache entry in cache for the longest time. Thus, after the latest read event, it is more likely that cache 4 (130D) will keep the entry on-chip longer than the current owner, cache 1 (130A). On average, transfers for the cache entry may be reduced by transferring ownership of the cache entry to the cache with the highest probability of holding the cache entry for the longest amount of time. Thus, upon copying cache entry data to a new reader cache, the owner cache can flag the entry to enter the owned state at the reader cache. Thus, the original owner, i.e. cache 1 (130A) in FIG. 2, can transition from the owned state to the shared state, and the new reader cache, i.e. cache 4 (130D) in FIG. 2, can transition from the invalid state to the owned state and become the new owner of the cache entry. In some caching scenarios, ownership is captured by a cache upon writing to a cache entry, but transferring ownership to a latest reader cache as well can support reduced off-chip bandwidth consumption by reducing the writing of cache entries back to the off-chip memory 120.

Figure 3A:
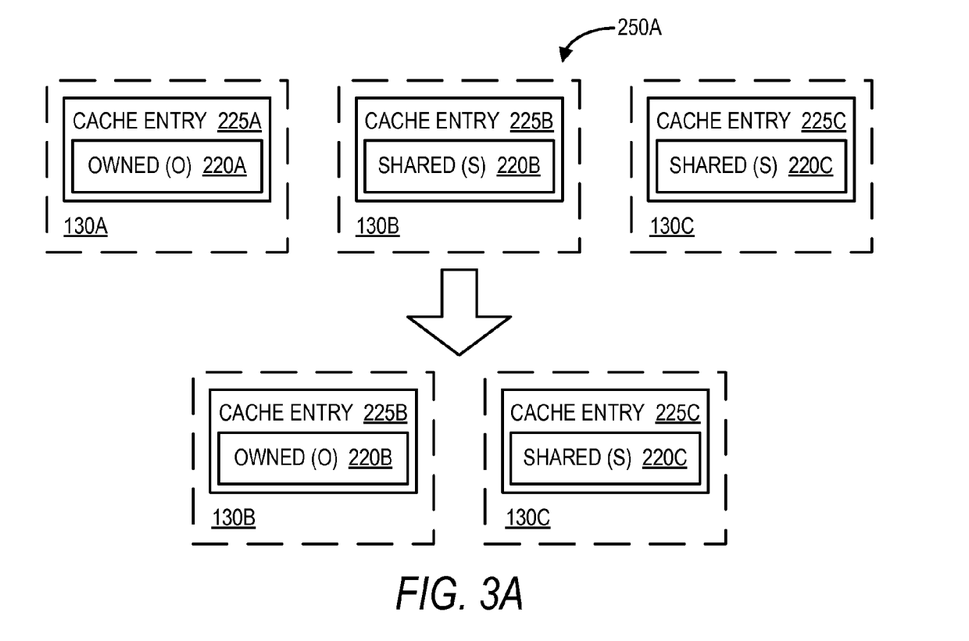
FIG. 3A is a state transition diagram 250A illustrating a transition from a shared state to an owned state.

FIG. 3A is a state transition diagram 250A illustrating a transition from a shared state to an owned state, arranged in accordance with the present disclosure. As previously described, a cache entry in a "shared" state may be the most recent version of the cache entry. A cache entry in the "owned" state may be the most recent version of the cache entry while other caches in the caches 130 may also have copies of the most recent version in the shared state.

As illustrated in the state transition diagram 250A, the cache entry 225A may initially be in an owned state, as indicated by the state indicator 220A. The cache 1 (130A), which contains the cache entry 225A, may be referred to as the owner cache in this example. The cache entry 225B and the cache entry 225C may initially be in a shared state, as indicated by the state indicators 220B, 220C, respectively. The cache 2 (130B) and the cache 3 (130C), which contain the cache entry 225B and the cache entry 225C, respectively, may be referred to as snoop caches in this example. The cache 1 (130A), the cache 2 (130B), and the cache 3 include the same cache entry in this example.

In the illustrated scenario described above with respect to FIG. 2, the owner cache may broadcast a pending eviction of the cache entry by posting an "ownership eviction" message. The snoop caches may detect the message and may respond by posting an "ownership acceptance" message. In the illustrated scenario, the owner cache may detect the ownership acceptance message from the cache 2 (130B) before the ownership acceptance message from the cache 3 (130C). As a result, ownership may be transferred from the cache entry 225A to the cache entry 225B, as illustrated in FIG. 3A. That is, the cache entry 225B may be transformed from the shared state the owned state. The cache entry 225A may be removed as a result of the eviction. The cache entry 225C may remain in a shared state, also as illustrated in FIG. 3A.

Figure 3B:
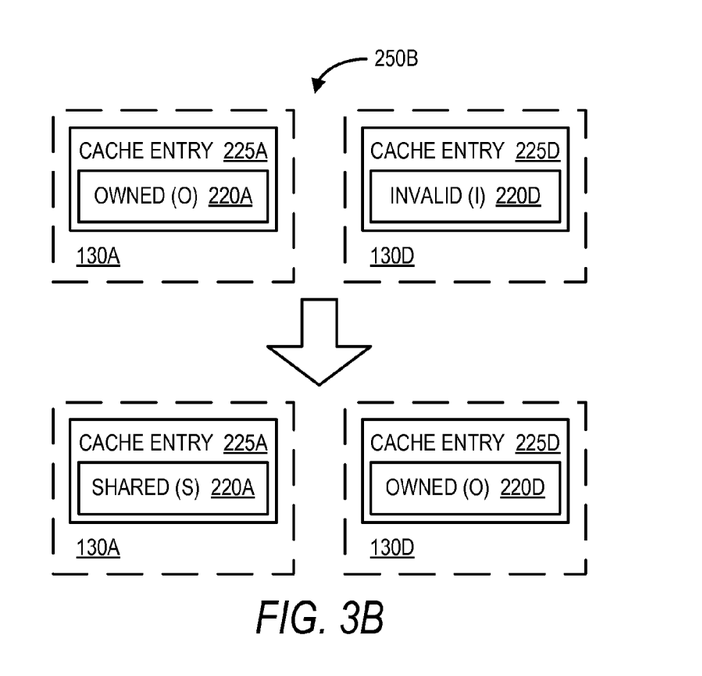
FIG. 3B is a state transition diagram illustrating a transition from an invalid state to an owned state.

FIG. 3B is a state transition diagram 250B illustrating a transition from an invalid state to an owned state, arranged in accordance with the present disclosure. As previously described, a cache entry in an "invalid" state may not have the most recent version of the cache entry, while other caches may have the most recent version.

As illustrated in the state transition diagram 250B, the cache entry 225A may initially be in an owned state, as indicated by the state indicator 220A. The cache 1 (130A), which contains the cache entry 225A, may be referred to as the owner cache in this example. The cache entry 225D may initially be in an invalid state, as indicated by the state indicator 220D. The cache 4 (130D), which contains the cache entry 225D and may be referred to as a reader cache in this example.

In the illustrated scenario described above with respect to FIG. 2, a read to the cache entry 225D may evoke a cache miss at the cache 4 (130D). Thus, the reader cache may post a "read request" message. The owner cache may detect the message and may respond by providing the data for the cache entry to the reader cache. Furthermore, the cache entry 225A may transition (i.e., be transformed) from the owned state to the shared state, as illustrated in FIG. 3B. The cache entry 225D may transition (i.e., be transformed) from the invalid state to the owned state, also as illustrated in FIG. 3B.

Figure 4:
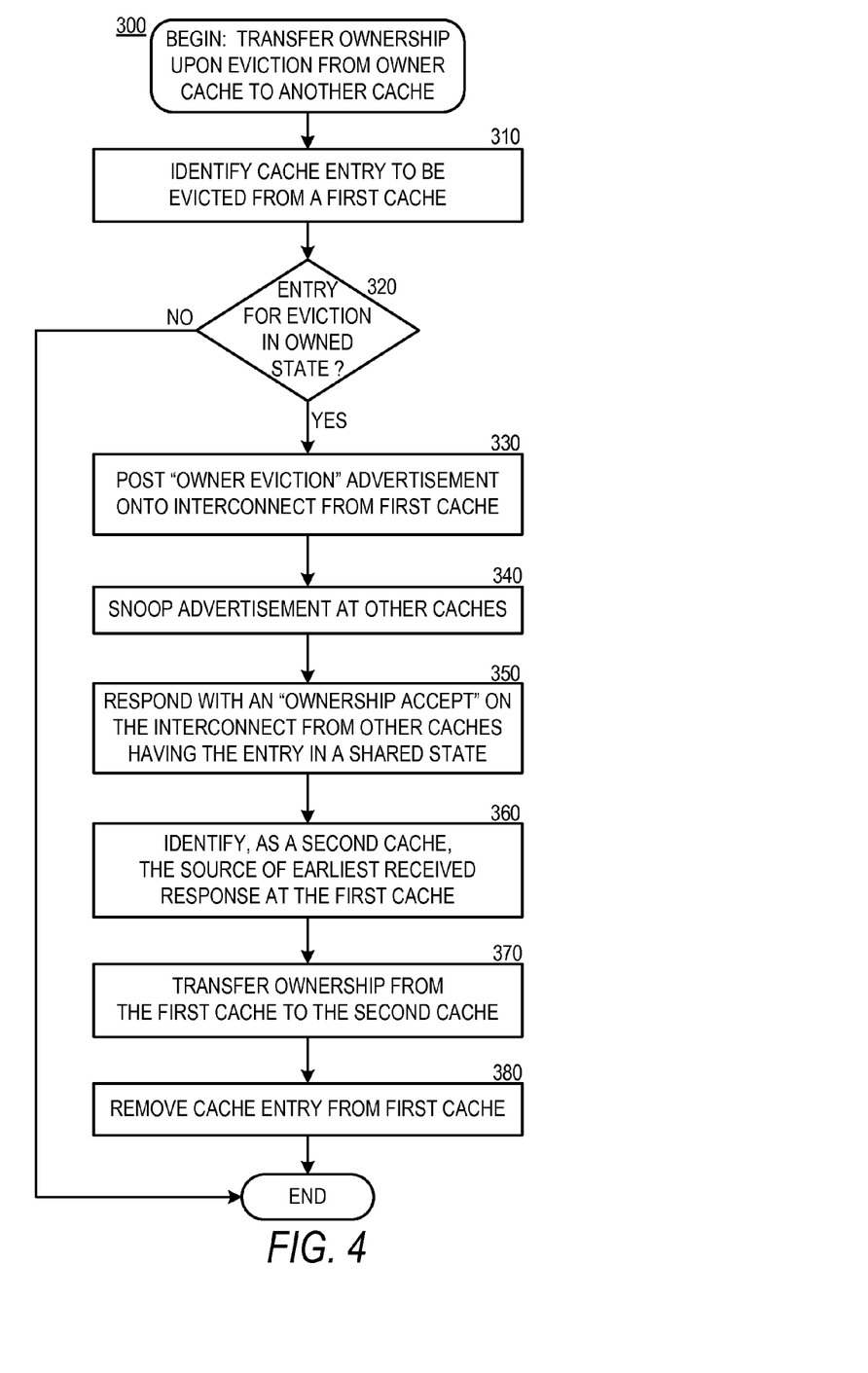
FIG. 4 is a flow diagram illustrating a process for transferring ownership to another cache upon eviction from an owner cache.

FIG. 4 is a flow diagram illustrating a process 300 for transferring ownership to another cache upon eviction from an owner cache, arranged in accordance with the present disclosure. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein may be referred to variously as state operations, structural devices, acts, or modules. These operations, structural devices, acts or modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein. Process 300 may include one or more of operations 310-380.

The process 300 may begin at operation 310, where a cache entry may be identified for eviction from a first cache in the caches 130. An eviction may arise when the cache entry is the least recently used entry at that particular cache and cache space is needed for a new entry to be stored. Operation 310 may be followed by operation 320.

At operation 320, the process 300 may determine if a cache entry to be evicted from the first cache is currently held in the owned state. This determination may be made by inspecting the state indicator 220 associated with the cache entry. If it is determined at operation 320 that the cache entry pending eviction is not in the owned state, the process 300 may terminate since there is no ownership to transfer. However, if it is determined at operation 320 that the cache entry pending eviction is indeed in the owned state, the process 300 may continue to operation 330.

At operation 330, an "owner eviction" advertisement message may be posted from the first cache onto the interconnect bus 115. Processing may continue to operation 340, where other caches 130 may snoop the advertisement message off of the interconnect bus 115. Continuing to operation 350, other caches 130 that currently have the same cache entry in the shared state can respond by posting an "ownership acceptance" message on the interconnect bus 115.

The "ownership acceptance" message can identify the other caches 130 where the cache entry pending eviction is currently stored as a shared copy. Proceeding to operation 360, the first cache may receive one or more "ownership acceptance" messages posted to the interconnect bus 115. The first cache may identify, as the second cache, the cache in the caches 130 associated with the earliest "ownership acceptance" message received at the first cache. That is, the earliest other cache having the entry in the shared state that gets its response to the current owner cache may be identified as the second cache. This second cache may be transferred ownership of the entry for being the earliest responder.

Where there are no other caches 130 holding the entry in the shared state, there will be no "ownership acceptance" messages received at the first cache and thus no second cache will be identified at operation 360. Instead, the eviction may occur to off-chip memory 120 in the traditional sense, and the process 300 may terminate.

Continuing to operation 370, the ownership of the cache entry pending eviction at the first cache may be transferred to the second cache that was identified in operation 360. Proceeding to operation 380, the cache entry may finally be removed, or evicted, from the first cache. Thus, the original owner cache may have evicted the cache entry without having to write the cache entry out to off-chip memory 120. Avoiding the write to off-chip memory 120 may result in reduced off-chip bandwidth consumption. The process 300 may terminate after operation 380.

It should be appreciated that the "earliest responder" technique addressed with respect to operation 360 is an approach for mediating between multiple shared caches 130 accepting ownership at once. Various other mediation techniques may be used aside from this "earliest responder" technique without departing from the spirit or scope of the disclosed technology.

Figure 5:
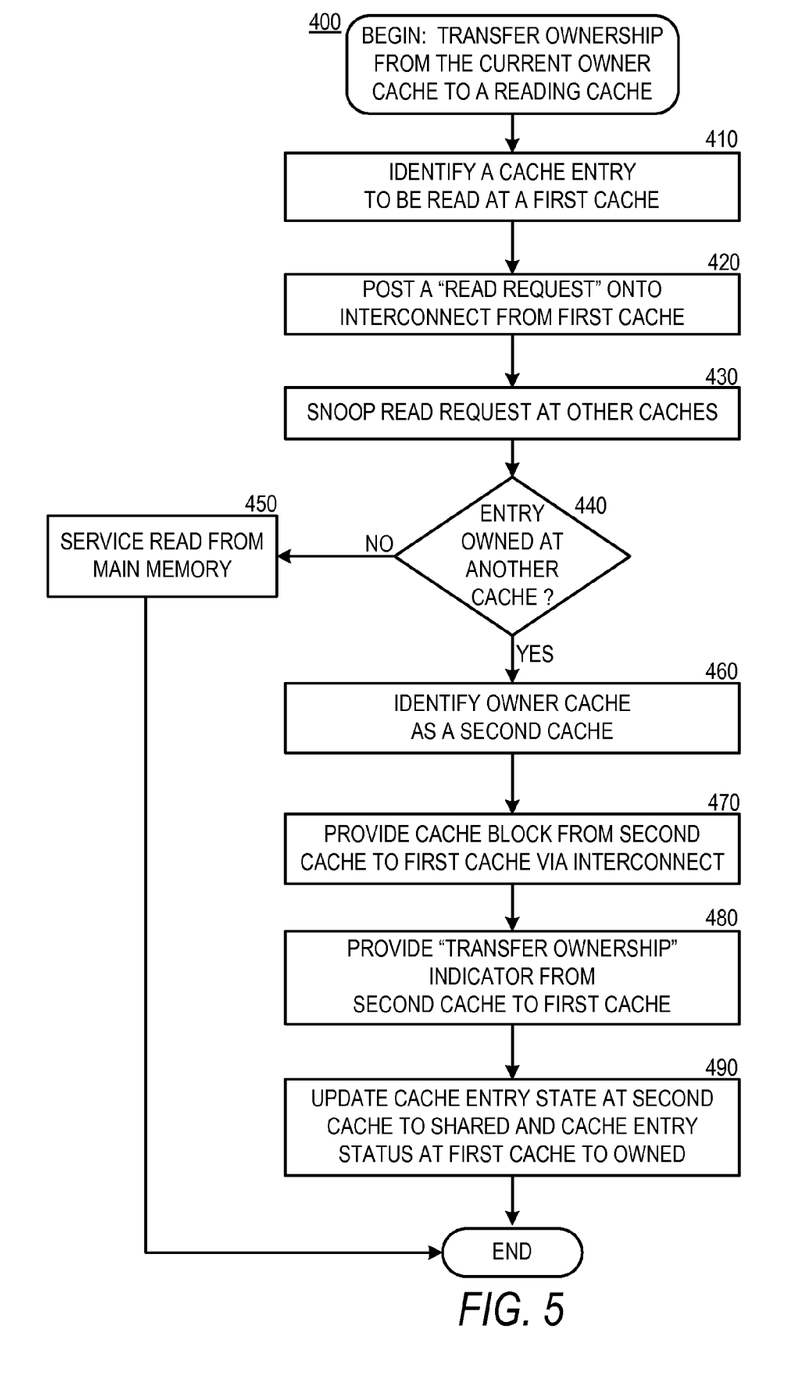
FIG. 5 is a flow diagram illustrating a process for transferring ownership from a current owner cache to a reader cache.

FIG. 5 is a flow diagram illustrating aspects of a process 400 for transferring ownership from a current owner cache to a reader cache, arranged in accordance with the present disclosure. Process 400 may include one or more of operations 410-490. The process 400 may begin at operation 410, where a cache entry may be identified as being read at a first cache in the caches 130 where the cache entry may currently be invalid. A read from a cache where the cache entry is in the invalid state may cause a cache miss. Continuing to operation 420, the cache miss at the first cache may invoke posting a "read request" message to the interconnect bus 115 from the first cache. Proceeding to operation 430, other caches 130 can snoop the message off of the interconnect bus 115. Operation 430 may be followed by operation 440.

At operation 440, the process 400 may determine if the cache entry identified for reading at operation 410 is currently in an owned state at any other caches 130. If it is determined at operation 440 that the entry is not owned at another cache in the caches 130, the process 400 may transition to operation 450 where the read is serviced from the off-chip memory 120. It should be appreciated that some embodiments may support servicing the read from another cache 130 where the data is held at that cache 130 in a valid cache entry. As such, operation 450 may service the read from off-chip memory 120 or operation 450 may service the read from another cache 130 where the data is valid, according to embodiments. The process 400 may terminate after operation 450. If instead it is determined at operation 440 that the cache entry is owned at another cache in the caches 130, the process 300 may transition to operation 460.

At operation 460, the current owner cache determined at operation 440 may be identified as a second cache. Continuing to operation 470, the data associated with the cache entry may be provided from the second cache, where the cache entry is currently owned, to the first cache where data associated with the cache entry is being read. The interconnect bus 115 may be used to provide the data from the second cache to the first cache.

Processing may continue at operation 480, where ownership may be transferred from the second cache to the first cache. This transfer may occur while copying the data of the cache entry to the new reader cache in operation 470. During the copy operation, the owner cache may flag the cache entry to enter the owned state upon arrival of the cache entry at the first cache. Continuing to operation 490, the second cache, or the original owner, may transition from the owned state to the shared state. The new reader, or first cache, may transition from the invalid state to the owned state. The process 400 may terminate after operation 490.

Temporal locality dictates that the most recently accessing cache in the caches 130, in this case the new reader cache or first cache, may tend to keep the cache entry for the longest period of time. Thus, after the latest read event, it is more likely that the first cache will keep the cache entry on-chip longer than the current owner or second cache. On average, transfers for the cache entry may be reduced by transferring ownership of the cache entry to the cache with the highest probability of holding the cache entry for the longest period of time. By considering a cache ownership transfer at every new read, and not just upon a write operation, this approach may also continuously identify other caches in the caches 130 that improve the time for keeping the cache entry on chip. This can reduce transfers from the caches 130 to the off-chip memory 120.

Figure 6:
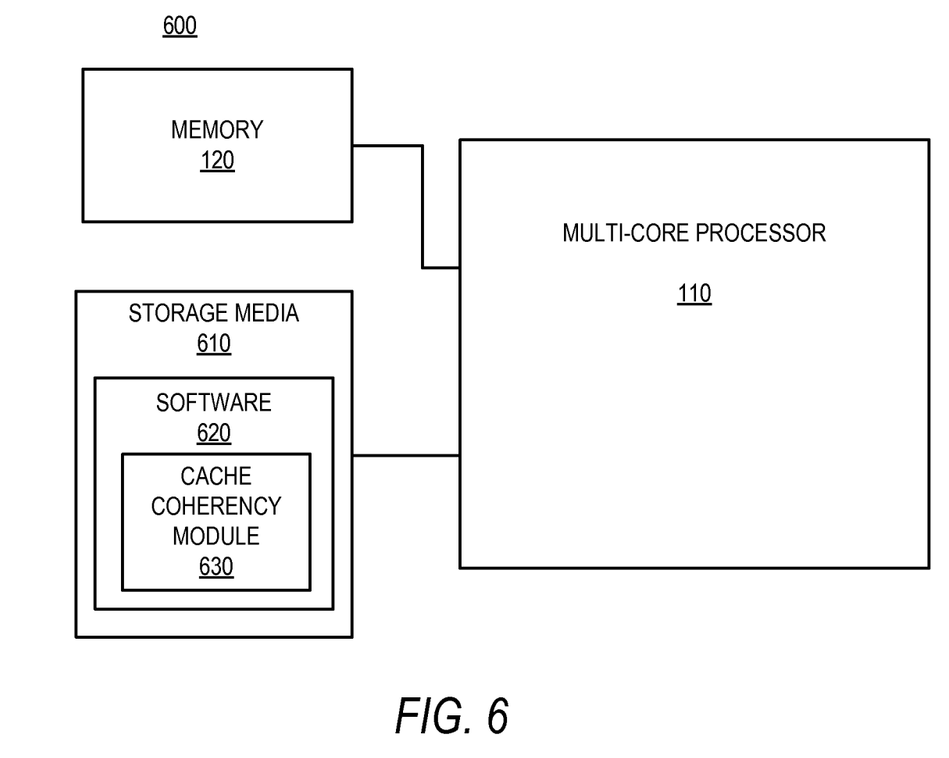
FIG. 6 is a functional block diagram illustrating an operating environment for a multi-core processor.

FIG. 6 is a functional block diagram 600 illustrating an operating environment for a multi-core processor 110, arranged in accordance with the present disclosure. Instructions and data associated with operations on the multiple cores of the multi-core processor 110 may be stored on a storage media 610 device or devices. The storage media 610 may support the nonvolatile storage of information. The storage media 610 may be accessed by the multiple processor cores within the multi-core processor 110. The storage media 610 may store software 620 for execution on the multiple processor cores within the multi-core processor 110.

By way of example and not limitation, computer-readable media may comprise computer storage media and communication media. Computer storage media may include volatile, non-volatile, removable, and non-removable media implemented for the storage of information such as computer-readable instructions, data structures, program modules, or other data. Computer storage media may include, but is not limited to, RAM, ROM, EPROM, EEPROM, flash memory, other solid state memory technology, CD-ROM, DVD, HD-DVD, BLU-RAY, other optical storage, magnetic cassettes, magnetic tape, magnetic disk storage, and other magnetic storage devices, which can be used to store the desired information and which can be accessed by the multi-core processor 110.

The software 620, or other instructions, code, modules, or programs associated with the multi-core processor 110 may include modules for performing the multi-core processor cache coherency functions described herein in various embodiments. Such software 620 may include a cache coherency module 630, as illustrated in FIG. 6.

Figure 7:
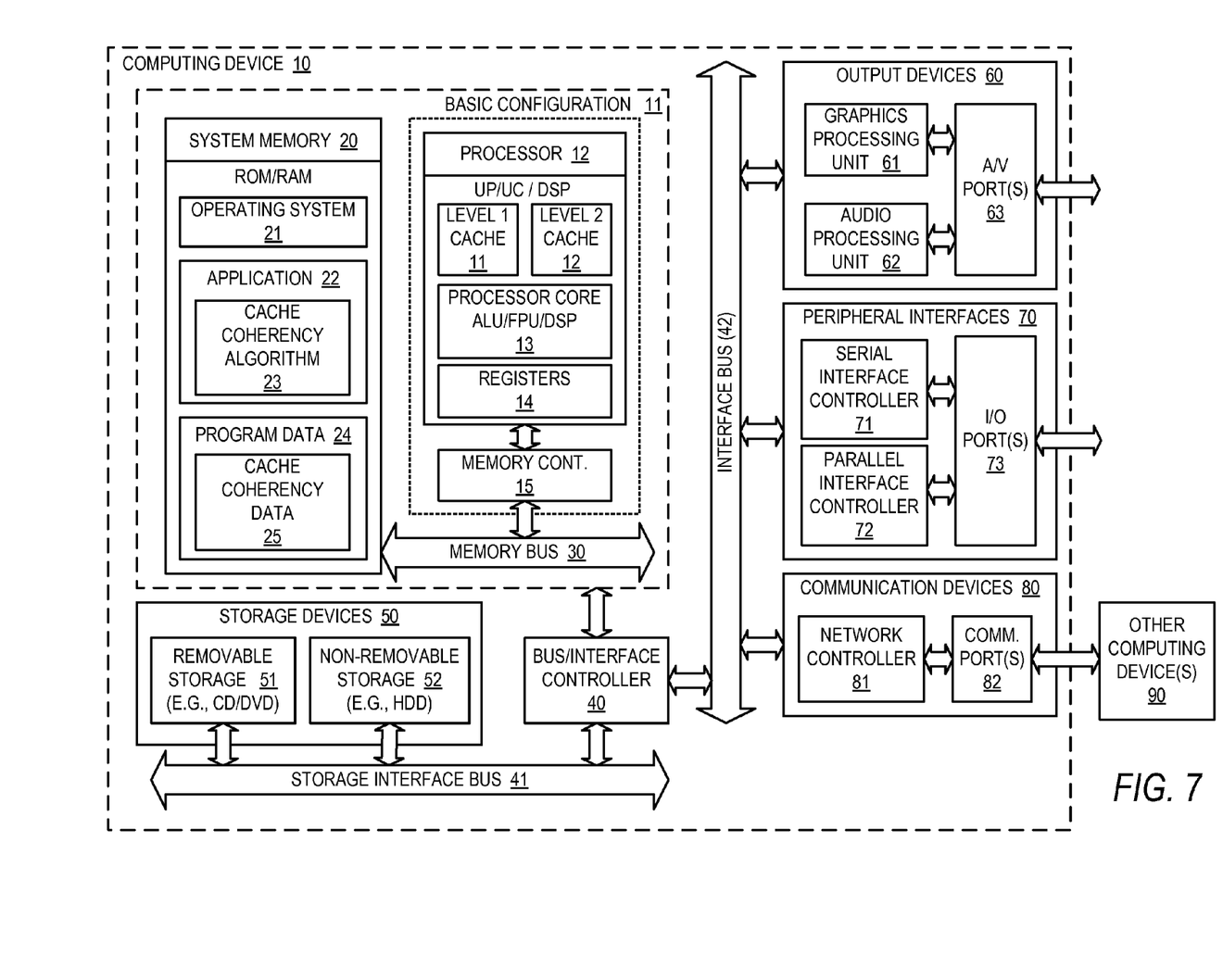
FIG. 7 is a block diagram illustrating an example computing device that is arranged for multi-core processor cache coherence, all arranged in accordance with the present disclosure.

FIG. 7 is a block diagram illustrating an example computing device 10 that is arranged for multi-core processor cache coherence, arranged in accordance with the present disclosure. In a very basic configuration 11, computing device 10 typically includes one or more processors 12 and system memory 20. A memory bus 30 may be used for communicating between the processor 12 and the system memory 20.

Depending on the desired configuration, processor 12 may be of any type including but not limited to a microprocessor (μP), a microcontroller (μC), a digital signal processor (DSP), or any combination thereof. Processor 12 may include one more levels of caching, such as a level one cache 16 and a level two cache 17, a processor core 13, and registers 14. An example processor core 13 may include an arithmetic logic unit (ALU), a floating point unit (FPU), a digital signal processing core (DSP Core), or any combination thereof. An example memory controller 15 may also be used with the processor 12, or in some implementations the memory controller 15 may be an internal part of the processor 12.

Depending on the desired configuration, the system memory 20 may be of any type including but not limited to volatile memory (such as RAM), non-volatile memory (such as ROM, flash memory, etc.) or any combination thereof. System memory 20 may include an operating system 21, one or more applications 22, and program data 24. Application 22 may include a cache coherency algorithm 23 that is arranged to support a virtualization of a multi-core processor and multi-core processor cache coherency disclosed herein. Program data 24 includes cache coherency data 25, as will be further described below. In some embodiments, application 22 may be arranged to operate with program data 24 on an operating system 21 such that a multi-core processor with cache coherency, as discussed herein, may be operated as a virtual computing environment on the computing device 10. The computing device 10 may also support one or more multi-core processors as its processor 12. One or more of these multi-core processors may feature multi-core processor cache coherency as discussed herein. The described basic configuration is illustrated in FIG. 8 by those components within dashed line 11.

Computing device 10 may have additional features or functionality, and additional interfaces to facilitate communications between the basic configuration 11 and any required devices and interfaces. For example, a bus/interface controller 40 may be used to facilitate communications between the basic configuration 11 and one or more data storage devices 50 via a storage interface bus 41. The data storage devices 50 may be removable storage devices 51, non-removable storage devices 52, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 20, removable storage devices 51 and non-removable storage devices 52 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 10. Any such computer storage media may be part of computing device 10.

Computing device 10 may also include an interface bus 42 for facilitating communication from various interface devices (e.g., output interfaces, peripheral interfaces, and communication interfaces) to the basic configuration 11 via the bus/interface controller 40. Example output devices 60 include a graphics processing unit 61 and an audio processing unit 62, which may be configured to communicate to various external devices such as a display or speakers via one or more A/V ports 63. Example peripheral interfaces 70 include a serial interface controller 71 or a parallel interface controller 72, which may be configured to communicate with external devices such as input devices (e.g., keyboard, mouse, pen, voice input device, touch input device, etc.) or other peripheral devices (e.g., printer, scanner, etc.) via one or more I/O ports 73. An example communication device 80 includes a network controller 81, which may be arranged to facilitate communications with one or more other computing devices 90 over a network communication link via one or more communication ports 82.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 10 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 10 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, components, apparatuses, or assemblies, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim 1ncludes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A method to maintain cache coherency within a multi-core processor, the method comprising:
    identifying a first cache entry to be evicted from a first cache, the first cache entry comprising a block of data and a first tag indicating an owned state;
    in response to identifying the first cache entry to be evicted from the first cache, broadcasting an owner eviction message for the first cache entry from the first cache;
    identifying a second cache entry in a second cache, the second cache entry comprising the block of data and a second tag indicating a shared state;

detecting the broadcasted owner eviction message for the first cache entry from the first cache with the second cache;

in response to the second cache detecting the broadcasted owner eviction message for the first cache entry from the first cache, broadcasting an ownership acceptance message for the second cache entry from the second cache;

detecting the broadcasted ownership acceptance message for the second cache entry from the second cache with the first cache; and in response to the first cache detecting the broadcasted ownership acceptance message for the second cache entry from the second cache, transforming the second tag in the second cache entry from the shared state to the owned state.

2. The method of claim 1, wherein broadcasting the owner eviction message for the first cache entry from the first cache comprises broadcasting the owner eviction message for the first cache entry from a first cache controller associated with the first cache.

3. The method of claim 2, wherein detecting the broadcasted owner eviction message for the first cache entry from the first cache with the second cache comprises detecting the broadcasted owner eviction message for the first cache entry from the first cache with a second cache controller associated with the second cache.

4. The method of claim 3, wherein broadcasting the ownership acceptance message for the second cache entry from the second cache comprises broadcasting the ownership acceptance message for the second cache entry from the second cache controller associated with the second cache.

5. The method of claim 4, wherein detecting the broadcasted ownership acceptance message for the second cache entry from the second cache with the first cache comprises detecting the broadcasted ownership acceptance message for the second cache entry from the second cache with the first cache controller associated with the first cache.

6. The method of claim 1, wherein the first cache and the second cache are operative to support a MOESI (Modified, Owned, Exclusive, Shared, Invalid) cache coherency protocol.

7. The method of claim 1, wherein the first cache and the second cache are operative to support a broadcast and snoop cache coherency protocol.

8. The method of claim 1, wherein in response to the first cache detecting the broadcasted ownership acceptance message for the second cache entry from the second cache, transforming the second tag in the second cache entry from the shared state to the owned state comprises:

in response to the first cache detecting the broadcasted ownership acceptance message for the second cache entry from the second cache, determining whether the second cache is an earliest responder from among a plurality of caches, the plurality of caches each having a respective cache entry corresponding to the block of data and a respective tag indicating the shared state; and in response to determining that the second cache is the earliest responder from among the plurality of caches, transforming the second tag in the second cache entry from the shared state to the owned state.

9. The method of claim 1, further comprising in response to transforming the second tag in the second cache entry from the shared state to the owned state, removing the first cache entry from the first cache.

10. The method of claim 1, wherein transforming the second tag in the second cache entry from the shared state to the owned state comprises transforming the second tag in the second cache entry from the shared state to the owned state without accessing an off-chip memory interface.

11. The method of claim 1, further comprising:

identifying a cache miss for a requested block of data at a third cache entry of a third cache, the third cache entry comprising a stale block of data and a third tag indicating an invalid state;

in response to identifying the cache miss for the requested block of data at the third cache entry of the third cache, broadcasting a read request message for the third cache entry from the third cache;

identifying a fourth cache entry in a fourth cache, the fourth cache entry comprising the requested block of data and a fourth tag indicating an owned state;

detecting the broadcasted read request message for the third cache entry from the third cache with the fourth cache; and in response to the fourth cache detecting the broadcasted read request message for the third cache entry from the third cache, transferring the requested block of data from the fourth cache entry in the fourth cache to the third cache entry in the third cache, the transfer being operative to replace the stale block of data in the third cache entry with the requested block of data 12. A method to maintain cache coherency within a multi-core processor, the method comprising:

identifying a cache miss for a requested block of data at a first cache entry in a first cache, the first cache entry comprising a stale block of data and a first tag indicating an invalid state;

in response to identifying the cache miss for the requested block of data at the first cache entry in the first cache, broadcasting a read request message for the first cache entry from the first cache;

identifying a second cache entry in a second cache, the second cache entry comprising the requested block of data and a second tag indicating an owned state;

detecting the broadcasted read request message for the first cache entry from the first cache with the second cache; and in response to the second cache detecting the broadcasted read request message for the first cache entry from the first cache, transferring the requested block of data from the second cache entry in the second cache to the first cache entry in the first cache, the transfer being operative to replace the stale block of data in the first cache entry with the requested block of data.

13. The method of claim 12, wherein transferring the requested block of data from the second cache entry in the second cache to the first cache entry in the first cache comprises transferring the requested block of data from the second cache entry in the second cache to the first cache entry in the first cache without accessing an off-chip memory interface.

14. The method of claim 12, further comprising in response to transferring the requested block of data from the second cache entry in the second cache to the first cache entry in the first cache, transforming the first tag in the first cache entry from the invalid state to the owned state and transforming the second tag in the second cache entry from the owned state to a shared state.

15. The method of claim 12, wherein broadcasting the read request message for the first cache entry from the first cache comprising broadcasting the read request message for the first cache entry from a first cache controller associated with the first cache.

16. The method of claim 15, wherein detecting the broadcasted read request message for the first cache entry from the first cache with the second cache comprises detecting the broadcasted read request message for the first cache entry from the first cache with a second cache controller associated with the second cache.

17. The method of claim 12, wherein the first cache and the second cache are operative to support a MOESI (Modified, Owned, Exclusive, Shared, Invalid) cache coherency protocol.

18. The method of claim 12, wherein the first cache and the second cache are operative to support a broadcast and snoop cache coherency protocol.

19. The method of claim 12, further comprising:
identifying a third cache entry to be evicted from a third cache, the third cache entry comprising a block of data and a third tag indicating the owned state;
in response to identifying the third cache entry to be evicted from the third cache, broadcasting an owner eviction message for the third cache entry from the third cache;
identifying a fourth cache entry in a fourth cache, the fourth cache entry comprising the block of data and a fourth tag indicating a shared state;
detecting the broadcasted owner eviction message for the third cache entry from the third cache with the fourth cache;
in response to the fourth cache detecting the broadcasted owner eviction message for the third cache entry from the third cache, broadcasting an ownership acceptance message for the fourth cache entry;
detecting the broadcasted ownership acceptance message for the fourth cache entry with the third cache; and
in response to the third cache detecting the broadcasted ownership acceptance message for the fourth cache entry, transforming the fourth tag in the fourth cache entry from the shared state to the owned state.

20. A multi-core processor operable to maintain cache coherency, the multi-core processor comprising:
a first processor core and a second processor core;
a first cache associated with the first processor core and a second cache associated with the second processor core; and
a first cache controller associated with the first cache and a second cache controller associated with the second cache,
wherein the first cache controller is operable to:
identify a first cache entry to be evicted from the first cache, the first cache entry comprising a block of data and a first tag indicating an owned state, and
broadcast an owner eviction message for the first cache entry in response to identification of the first cache entry to be evicted from the first cache,
wherein the second cache controller is operable to:
identify a second cache entry in the second cache, the second cache entry comprising the block of data and a second tag indicating a shared state,
detect the broadcasted owner eviction message for the first cache entry from the first cache controller, and
broadcast an ownership acceptance message for the second cache entry in response to detection of the broadcasted owner eviction message for the first cache entry from the first cache controller,
wherein the first cache controller is further operable to:
detect the broadcasted ownership acceptance message for the second cache entry from the second cache controller, and
wherein the second cache controller is further operable to:
transform the second tag in the second cache entry from the shared state to the owned state in response to detection by the first cache controller of the broadcasted ownership acceptance message for the second cache entry.

21. The multi-core processor of claim 20, wherein the first cache and the second cache are operative to support a MOESI (Modified, Owned, Exclusive, Shared, Invalid) cache coherency protocol.

22. The multi-core processor of claim 20, wherein the first cache and the second cache are operative to support a broadcast and snoop cache coherency protocol.

23. The multi-core processor of claim 20, wherein to transform the second tag in the second cache entry from the shared state to the owned state in response to detection by the first cache controller of the broadcasted ownership acceptance message for the second cache entry, the second cache controller is operable to:
determine whether the second cache controller is an earliest responder from among a plurality of cache controllers coupled to a corresponding plurality of caches, wherein each of the plurality of caches includes a respective cache entry comprising the block of data and a respective tag indicating the shared state in response to detection by the first cache controller of the broadcasted ownership acceptance message for the second cache entry from the second cache, and
transform the second tag in the second cache entry from the shared state to the owned state in response to determination that the second cache controller is the earliest responder from among the plurality of cache controllers.

24. The multi-core processor of claim 20, wherein the first cache controller is further operable to remove the first cache entry from the first cache in response to transformation of the second tag in the second cache entry from the shared state to the owned state.

25. The multi-core processor of claim 20, wherein to transform the second tag in the second cache entry from the shared state to the owned state, the second cache controller is operable to transform the second tag in the second cache entry from the shared state to the owned state without accessing an off-chip memory interface coupled to the multi-core processor.

26. The multi-core processor of claim 20, further comprising:
a third processor core and a fourth processor core;
a third cache associated with the third processor core and a fourth cache associated with the fourth processor core, the third and fourth caches being coupled to an off-chip memory interface; and
a third cache controller associated with the third cache and a fourth cache controller associated with the fourth cache,
wherein the third cache controller is operable to:
identify a cache miss for a requested block of data at a third cache entry in the third cache, the third cache entry comprising a stale block of data and a third tag indicating an invalid state, and
broadcast a read request message for the third cache entry in response to identification of the cache miss for the requested block of data at the third cache entry in the third cache, and
wherein the fourth cache controller is operable to:
identify a fourth cache entry in the fourth cache, the fourth cache entry comprising the requested block of data and a fourth tag indicating the owned state, detect the broadcasted read request message for the third cache entry from the third cache controller, and transfer the requested block of data from the fourth cache entry in the fourth cache to the third cache entry in the third cache in response to detection of the broadcasted read request message for the third cache entry from the third cache controller, the transfer being operative to replace the stale block of data in the third cache entry with the requested block of data.

27. A multi-core processor operable to maintain cache coherency, the multi-core processor comprising:

a first processor core and a second processor core;

a first cache associated with the first processor core and a second cache associated with the second processor core; and a first cache controller associated with the first cache and a second cache controller associated with the second cache, wherein the first cache controller is operable to:
identify a cache miss for a requested block of data at a first cache entry in the first cache, the first cache entry comprising a stale block of data and a first tag indicating an invalid state, and
broadcast a read request message for the first cache entry in response to identification of the cache miss for the requested block of data at the first cache entry in the first cache, and wherein the second cache controller is operable to:
identify a second cache entry in the second cache, the second cache entry comprising the requested block of data and a second tag indicating an owned state,
detect the broadcasted read request message for the first cache entry from the first cache controller, and
transfer the requested block of data from the second cache entry in the second cache to the first cache entry in the first cache in response to detection of the broadcasted read request message for the first cache entry from the first cache controller, the transfer being operative to replace the stale block of data in the first cache entry with the requested block of data.

28. The multi-core processor of claim 27, wherein to transfer the requested block of data from the second cache entry in the second cache to the first cache entry in the first cache, the second cache controller is operable to transfer the requested block of data from the second cache entry in the second cache to the first cache entry in the first cache without accessing an off-chip memory interface coupled to the multi-core processor.

29. The multi-core processor of claim 27, wherein the first cache controller is further operable to transform the first tag in the first cache entry from the invalid state to the owned state, and wherein the second cache controller is further operable to transform the second tag in the second cache entry from the owned state to a shared state in response to transfer of the requested block of data from the second cache entry in the second cache to the first cache entry in the first cache.

30. The multi-core processor of claim 27, wherein the first cache and the second cache are operative to support a MOESI (Modified, Owned, Exclusive, Shared, Invalid) cache coherency protocol.

31. The multi-core processor of claim 27, wherein the first cache and the second cache are operative to support a broadcast and snoop cache coherency protocol.

32. The multi-core processor of claim 27, further comprising:

a third processor core and a fourth processor core;

a third cache associated with the third processor core and a fourth cache associated with the fourth processor core; and a third cache controller associated with the third cache and a fourth cache controller associated with the fourth cache, wherein the third cache controller is operable to:
identify a third cache entry to be evicted from the third cache, the third cache entry comprising a block of data and a third tag indicating the owned state, and
broadcast an owner eviction message for the third cache entry in response to identification of the third cache entry to be evicted from the third cache, wherein the fourth cache controller is operable to:
identify a fourth cache entry in the fourth cache, the fourth cache entry comprising the block of data and a fourth tag indicating a shared state,
detect the broadcasted owner eviction message for the third cache entry from the third cache, and
broadcast an ownership acceptance message for the fourth cache entry in response to detection of the broadcasted owner eviction message for the third cache entry from the third cache controller, wherein the third cache controller is further operable to:
detect the broadcasted ownership acceptance message for the fourth cache entry from the fourth cache controller, and wherein the fourth cache controller is further operable to:
transform the fourth tag in the fourth cache entry from the shared state to the owned state in response to detection by the third cache controller of the broadcasted ownership acceptance message for the fourth cache entry from the fourth cache controller.

* * * * *

UNITED STATES PATENT AND TRADEMARK OFFICE
CERTIFICATE OF CORRECTION

| | | |
|---|---|---|
| PATENT NO. | : 8,615,633 B2 | Page 1 of 1 |
| APPLICATION NO. | : 12/428563 | |
| DATED | : December 24, 2013 | |
| INVENTOR(S) | : Solihin | |

It is certified that error appears in the above-identified patent and that said Letters Patent is hereby corrected as shown below:

On Title Page 2, in Item (56), under "OTHER PUBLICATIONS", in Column 1, Line 11, delete "et al,," and insert -- et al., --, therefor.

In the Specifications

In Column 13, Line 65, delete "1ncludes" and insert -- includes --, therefor.

In the Claims

In Column 16, Line 25, in Claim 11, delete "data" and insert -- data. --, therefor.

Signed and Sealed this
Thirteenth Day of May, 2014

Michelle K. Lee
*Deputy Director of the United States Patent and Trademark Office*